United States Patent [19]
McIntyre

[11] 3,872,955
[45] Mar. 25, 1975

[54] CONNECTING MECHANISM
[75] Inventor: Duane E. McIntyre, Jackson, Mich.
[73] Assignee: Clark Equipment Company, Buchanan, Mich.
[22] Filed: June 18, 1973
[21] Appl. No.: 371,102

[52] U.S. Cl............................ 192/67 R, 192/89 QT
[51] Int. Cl............................................... F16d 7/00
[58] Field of Search............ 192/67 R, 89 QT, 99 S

[56] References Cited
UNITED STATES PATENTS

| | | | |
|---|---|---|---|
| 947,962 | 2/1910 | Butler | 192/67 R |
| 1,070,538 | 8/1913 | Ross | 192/89 QT |
| 1,540,247 | 6/1925 | Bowman | 192/99 S |
| 1,692,070 | 11/1928 | Athimon | 192/99 S |
| 2,049,126 | 7/1936 | Maybach | 192/67 R |
| 2,795,964 | 6/1957 | Short | 192/67 R |
| 2,948,557 | 8/1960 | Howe et al. | 192/67 R |
| 3,157,258 | 11/1964 | Cronholm | 192/67 R |
| 3,240,304 | 3/1966 | Wickersham | 192/67 R |
| 3,337,245 | 8/1967 | Prange | 192/67 R |

Primary Examiner—Wesley S. Ratliff, Jr.
Attorney, Agent, or Firm—Ernst H. Ruf

[57] ABSTRACT

A connecting mechanism for selectively connecting first and second shaft ends having allochiral sets of splines. An axially slidable collar has a third set of splines in constant mesh with one and is axially slidable with respect of both of said first and second sets of splines. An axially slidable yoke is connected to the collar, and there are means for actuating the yoke to effect immediate engagement between the third set of splines and the other of the first and second sets of splines under a first set of conditions, with the actuating means including means for storing energy so as to automatically effect engagement between the shaft ends after a delay under a second set of conditions.

6 Claims, 3 Drawing Figures

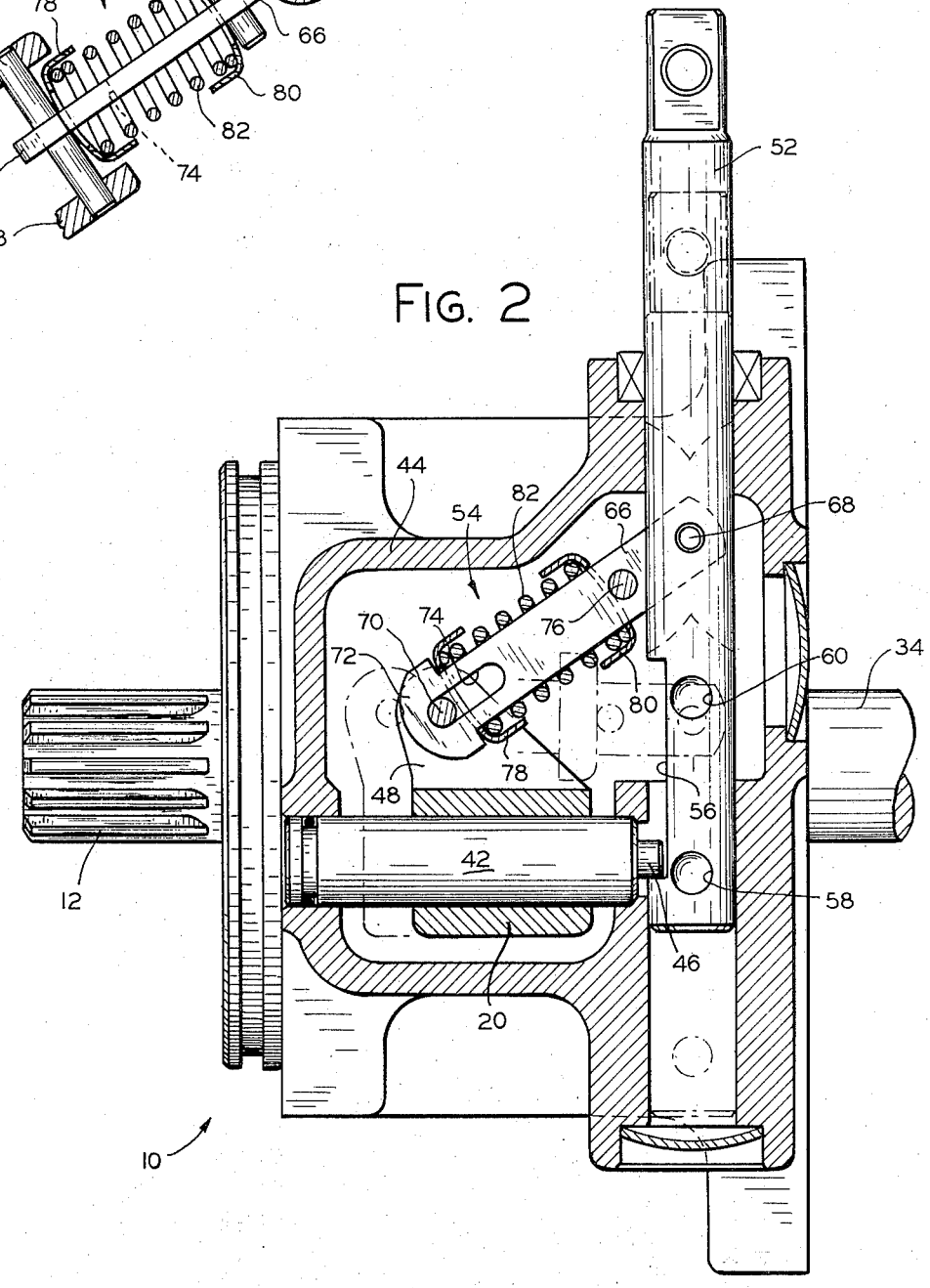

CONNECTING MECHANISM

BACKGROUND OF THE INVENTION

1. Field of the Invention

This invention relates to a connecting mechanism for selectively connecting two adjacent shaft ends for conjoint rotation. The present invention may be embodied, for example, for connecting the hydraulic driving pumps to the prime mover of a mobile crane. The main hydraulic pumps of a mobile crane are generally disconnected during road travel of the crane from one building site to another. It will be appreciated, however, that this invention is also useful for selectively connecting any driven shaft and any driving shaft.

2. Description of the Prior Art

Various devices and systems have been devised heretofore for selectively connecting two adjacent splined shaft ends. One known arrangement is for the operator to position the driving shaft in the proper position so that the driving shaft splines are in axial alignment with the driven shaft splines. This is usually accomplished by trial and error and may involve actuating the driving shaft several times until its splines come to rest in axial alignment with those of the driven shaft; otherwise, engagement cannot take place. This approach is not only time consuming but may also result in damaged splines if too much force is used.

The object of the present invention is to provide a connecting mechanism for selectively connecting two adjacent shaft ends for conjoint rotation that effects immediate engagement when the shaft ends are both axially and radially aligned, with the actuating means including means for storing energy when the shaft ends are only axially, but not radially, aligned. The energy-storing means in turn automatically effects engagement between the shaft ends upon subsequent radial alignment of the shaft ends.

SUMMARY OF THE INVENTION

In carrying out my invention in one preferred mode, I utilize a connecting mechanism for selectively connecting two adjacent shaft ends for conjoint rotation, wherein the connecting mechanism includes a first shaft end having a first set of splines. A second shaft end is concentric with the first shaft end and has a second set of external splines allochiral with the first set of splines, and a collar is axially slidable and concentric with respect to the first and second shaft ends and has a third set of splines in constant mesh with one, and is axially slidable with respect to both, of the shaft ends. An axially slidable yoke is connected to the collar and in turn connected with a yoke actuating means to effect immediate engagement between the third set of splines and one of the first and second sets of splines under first set of conditions, i.e., when the shaft ends are both axially and radially aligned. The actuating means also includes an energy-storing means to automatically effect engagement between the third set of splines and the other of the first and second sets of splines after a delay under a second set of conditions, i.e., when the shaft ends are only axially but not radially aligned, so that attempted engagement causes only axial abutment between the third set of splines and one of the first and second sets of splines. The axial abutment causes the actuating means to charge the energy storing means which in turn automatically actuates the yoke upon subsequent radial alignment of the first and second shaft ends.

BRIEF DESCRIPTION OF THE DRAWINGS

FIG. 2 is a partially schematic sectional top view of the connecting mechanism of this invention.

FIG. 3 is a simplified sectional view of the energy-storing portion of the connecting mechanism of this invention.

DESCRIPTION OF THE PREFERRED EMBODIMENTS

Figure 1:
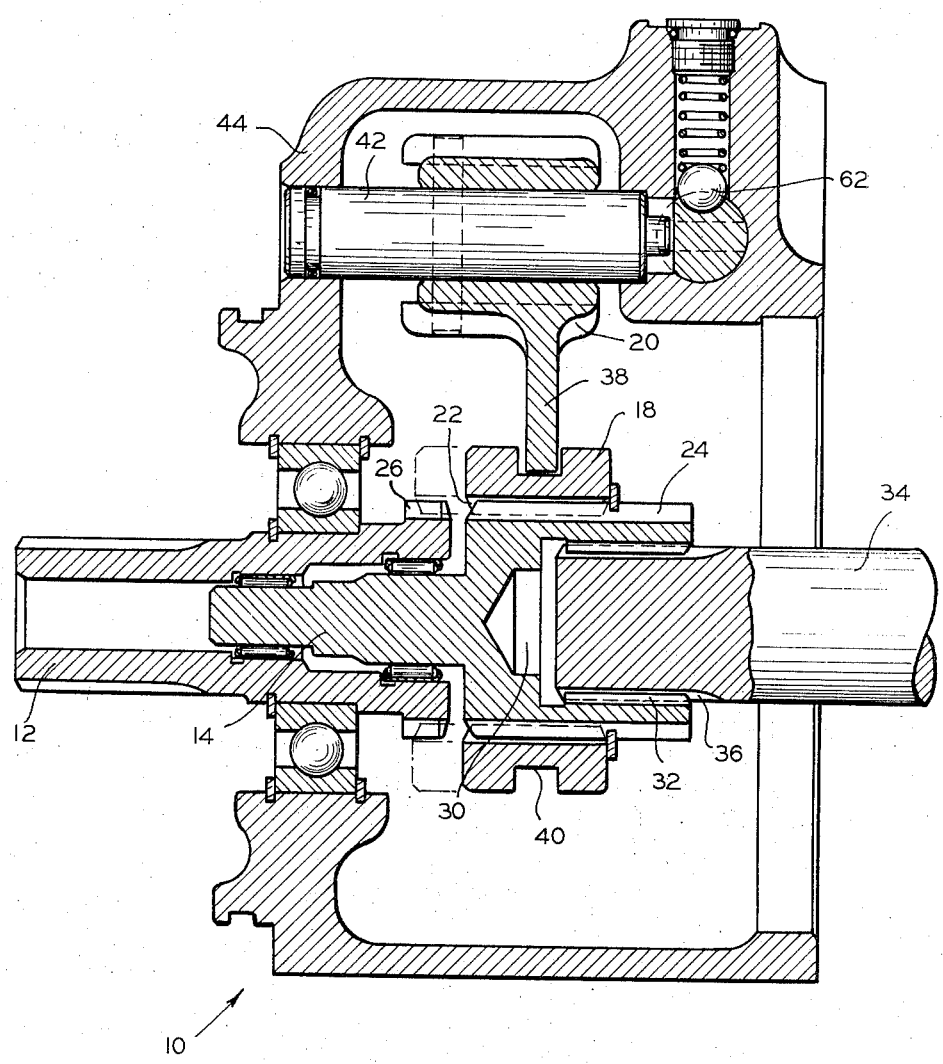
FIG. 1 is a simplified sectional frontal view of the connecting mechanism of this invention.

Referring now to the drawings in detail, FIGS. 1 and 2 illustrate a connecting mechanism, generally denoted by numeral 10, which may be used, for example, in a mobile hydraulic crane for connecting the hydraulic driving pumps to the engine. The main hydraulic pumps of a mobile crane are generally disconnected during road travel of the crane and then reconnected once the crane has arrived at its next utilization site.

Referring now to FIG. 1, connecting mechanism 10 includes a journalled driving or input shaft 12 which, for example, could be a power takeoff drive from the vehicle transmission, and a journalled driven or output shaft 14 which can be rotatably connected to driving or input shaft 12. Output shaft 14 may be selectively connected for rotation with input shaft 12 by means of a dog-type clutch which includes a collar 18 that is axially shiftable by means of a yoke 20. Collar 18 may thus be shifted from the disconnected position, shown in FIGS. 1 and 2, to the connected position, shown in phantom lines. Internal teeth or splines 22 of collar 18, which are in constant mesh with external teeth or splines 24 of shaft 14, can also mesh with external teeth or splines 26 of driving shaft 12 upon the axial movement of collar 18 by yoke 20. As best seen in FIG. 1, output shaft 14 has a bore 30 which has internal teeth 32 that are axially meshable, for example, with external teeth 36 input pump iinput shaft 34.

Yoke 20, which has a collar-engaging portion 38 receivable in peripheral groove 40 of collar 18, is axially slidable on pin 42 which, in turn, is supported on both ends thereof in mechanism housing 44.

As best seen in FIG. 2, an actuating means, generally denoted by numeral 54, which incorporates an over-center mechanism including rods or levers 52 and 66, is connected to wing members 48 of yoke 20, all of which will be described in more detail later.

FIG. 2 also shows that actuating lever 52 is axially movable for a distance slightly less than the length of its recessed area 56, with a boss portion 46 of pin 42, which extends into recessed area 56, serving as an over-stroke preventer. In addition, rod 52 is provided with first and second detent portions 58 and 60, respectively, that are designed to mate with spring loaded ball 62 (FIG. 1) so as to define disengaged and engaged positions, respectively. It is the feel of the engagement of ball 62 with lever detent portions 58 and 60 which provides the equipment operator with the knowledge that engagement and/or disengagement has taken place.

Lever 66 of actuating means 54 is pivotally secured near one end to rod 52, by means of pin 68, and pivotally and slidably secured near its other end, by means of pin 70, to wing members 48 of yoke 20. The end of lever 66 that is pivotally and slidably secured in relation to wing members 48, includes an enlarged end portion 72 and an elongated slot 74, with pin 70 extending through slot 74. Interposed between enlarged end portion 72 and pin or abutment means 76, which is located intermediate pins 68 and 70, is an energy-storing means 64 that includes first and second end caps 78 and 80 and resilient member 82. End caps 78 and 80 serve to restrain and confine the end portions of resilient member 82, generally in the form of a spring, interposed therebetween.

When it is desired to couple driving shaft 12 and output shaft 14, the operator manually shifts rod 52 from the disengaged position (shown in full lines in FIG. 2) to the engaged position (shown in phantom lines in FIG. 2) with the engagement being felt by the operator as ball 62 engages detent portion 60. Even though shafts 12 and 14 are always axially aligned, this does not necessarily mean that teeth or splines 26 and 24 are axially aligned, i.e., that shafts 12 and 14 are both axially and radially or angularly aligned. If teeth 24 and 26 are axially aligned when lever 52 is moved to the engaged position, then yoke 20 will readily slide on pin 42 and thereby axially shift collar 18 to the engaged position shown in phantom lines in FIG. 1, thus permitting the meshing of internal teeth 22 of collar 18 with external teeth 26 of shaft 12, thereby effectively coupling shafts 12 and 14. However, if teeth 24 and 26 are not axially aligned, internal teeth 22 of collar 18 will abut teeth 26 and no engagement can take place. This abutment of teeth 22 and 26, which inhibits the full axial movement of yoke 20 on pin 42, however, causes lever 66 of actuating mechanism 54 to slide relative to pin 70, thereby compressing spring member 82 between caps 78 and 80. It should be noted at this time that the coupling of shafts 12 and 14 is carried out while both shafts are at rest, and that when the operator pushes rod 52 to the engaged position, shafts 12 and 14 may or may not be coupled depending on a relative axial alignment of teeth 24 and 26. As previously noted, if teeth 24 and 26 are axially aligned, then collar 18 will be axially displaced to the extent of permitting meshing between collar teeth 22 and teeth 26 of shaft 12. Non-alignment of teeth 24 and 26 causes spring 82 to be compressed, thereby, in effect, charging energy-storing means 64. Upon the slight rotation of shaft 12 and/or shaft 14 (for example, during starting of the prime-mover engine), which rotation permits the axial alignment of teeth or splines 24 and 26, the energy stored in compressed spring 82 will cause axial displacement of yoke 20 and collar 18 and thereby permit the meshing of teeth 22 and 26, thus coupling shafts 12 and 14. Disengagement of shafts 12 and 14 can, of course, be accomplished by axially displacing lever 52 until ball 62 mates with detent portion 58, with disengagement preferably also being effected while shafts 12 and 14 are at rest. In this condition, collar 18 and yoke 20 are readily axially slidable, with lever 66 being pivotable about pins 70 and 68, respectively, thus providing a direct, non-resilient, mechanical connection between yoke 20 and levers 52 and 66 for disengagement purposes.

The connecting mechanism of this invention is most advantageously used for connecting any driven shaft 14 and any driving shaft 12 in the following manner: with both shafts at rest, actuating lever 52 is moved to the engaged position. If the adjacent teeth or splines 24 and 26 on shafts 14 and 12, respectively, are axially aligned (shafts 12 and 14 both axially and radially aligned) the coupling or connecting of shafts 12 and 14, by means of teeth 22 of collar 18, occurs immediately as a result of the movement of actuating lever 52. If teeth 24 and 26 are not axially aligned (shafts 12 and 14 axially but not radially aligned), then collar teeth 22 will abut shaft teeth 26, and although no coupling or engagement can take place, resilient member 82 of energy-storing means 64 is compressed. This in turn biases collar teeth 22 against shaft teeth 26 so that as soon as teeth 24 and 26 become axially aligned, by a slight rotation of one or both of shafts 12 and 14, collar teeth 22 are biased into axial engagement with shaft teeth 26. Since engagement is automatic once shaft teeth 24 and 26 become axially aligned, no operator effort, other than the initial axial movement of actuating rod 52, is required. No actuation of the starter, etc. by the operator is required to bring the respective teeth into alignment. Disengagement of shafts 12 and 14 is preferably accomplished with both shafts at rest since the transmission of torque during shaft rotation may make it difficult to axially slide collar 18.

The above detailed description, while disclosing only a single embodiment, is intended to be illustrative only. The embodiment described is subject to various modifications, changes and the like, without departing from the scope and spirit of the invention. Consequently, the scope of this invention should be determined solely by reference to the claims appended hereto.

I claim:

1. A connecting mechanism for selectively connecting two adjacent shaft ends for conjoint rotation comprising in combination:
   a. a first shaft end having a first set of external splines;
   b. a second shaft end concentric with said first shaft end and having a second set of external splines allochiral with said first set of splines;
   c. a collar axially slidable and concentric with respect to said first and second shaft ends and having a third set of internal splines in constant mesh with one, and axially slidable with respect to both of said first and second sets of splines;
   d. an axially slidable yoke connected with said collar;
   e. means for actuating said yoke to effect immediate engagement between said third set of splines and the other of said first and second sets of splines only when said shaft ends are both axially and radially aligned, said actuating means including means for storing energy, whne said shaft ends are only axially aligned, to effect engagement between said third set of splines and the other of said first and second sets of splines only after said shaft ends are both axially and radially aligned, said actuating means comprising an over-center mechanism and also providing a direct, non-resilient mechanical connection with said yoke for disengagement purposes, with said energy-storing means being operative only for engagement purposes.

2. The connecting mechanism of claim 1 wherein said yoke actuating means includes a movable first lever and a movable second lever, said second lever being pivotally connected near a first end thereof to said first lever, and pivotally and slidably connected near a second end thereof to said yoke.

3. The connecting mechanism of claim 2 wherein said energy-storing means is yieldably interposed between said yoke and said second lever and operable, if at all, only to effect engagement between said third and the other of said first and second sets of splines respectively.

4. The connecting mechanism of claim 3 wherein said second lever includes an enlarged end portion and an elongated slot portion near said second end thereof, as well as an abutment means intermediate said first and second ends.

5. The connecting mechanism of claim 4 wherein said energy-storing means is interposed between said enlarged head portion and said abutment means.

6. A connecting mechanism for selectively connecting two opposed and aligned members comprising in combination:
   a. an axially affixed and rotatable first toothed member;
   b. an axially affixed and rotatable second toothed mamber;
   c. a rotatable third toothed member in constant mesh with one and axially slidable with respect to both of said first and second toothed members;
   d. means for axially sliding said third toothed member;
   e. means for actuating said sliding means to effect immediate engagement between said third toothed member and the other of said first and second toothed members under a first set of conditions, said actuating means including means for storing energy so as to automatically effect engagement between said toothed members after a delay under a second set of conditions, said energy storing means being operative only for engagement purposes, with said second set of conditions including only axial but not radial alignment of said first and second toothed members so that attempted engagement between said third toothed member and one of said first and second toothed members causes only axial abutment but no engagement therebetween, said actuating means comprising an over-center mechanism and including a resilient member acting as said energy-storing means, with said actuating means also providing a non-resilient connection with said yoke for disengagement purposes.

* * * * *